US012795145B2

(12) United States Patent
Chen et al.

(10) Patent No.: US 12,795,145 B2
(45) Date of Patent: Nov. 10, 2026

(54) CROSS-COMPONENT RESIDUAL PREDICTION BY USING PREDICTION SAMPLE

(71) Applicant: Tencent America LLC, Palo Alto, CA (US)

(72) Inventors: Lien-Fei Chen, Palo Alto, CA (US); Roman Chernyak, Santa Clara, CA (US); Xin Zhao, San Jose, CA (US); Madhu Peringassery Krishnan, Mountain View, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 19/303,085

(22) Filed: Aug. 18, 2025

(65) Prior Publication Data

US 2025/0386045 A1 Dec. 18, 2025

Related U.S. Application Data

(63) Continuation of application No. PCT/US2024/025850, filed on Apr. 23, 2024.

(Continued)

(51) Int. Cl.

*H04N 19/159* (2014.01)
*H04N 19/117* (2014.01)

(Continued)

(52) U.S. Cl.

CPC .......... *H04N 19/50* (2014.11); *H04N 19/117* (2014.11); *H04N 19/132* (2014.11);

(Continued)

(58) Field of Classification Search

CPC .... H04N 19/50; H04N 19/117; H04N 19/132; H04N 19/172; H04N 19/176;

(Continued)

(56) References Cited

U.S. PATENT DOCUMENTS 8,029,798 B2 * 10/2011 Leroy .................. A61K 39/092 424/197.11
2022/0417517 A1 * 12/2022 Choi ...................... H04N 19/82

(Continued)

*Primary Examiner* — Howard D Brown, Jr.

(74) *Attorney, Agent, or Firm* — ARENTFOX SCHIFF LLP

(57) ABSTRACT

An apparatus of video decoding is provided. The apparatus includes processing circuitry. The processing circuitry is configured to receive a bitstream that includes syntax information for a current block. The syntax information indicates whether a P-CCRM is applied to the current block. The current block includes a luma component and a chroma component. When the syntax information indicates that the P-CCRM is applied to the current block, the processing circuitry is configured to derive chroma residual data of the chroma component based on luma residual data of the luma component. The processing circuitry is configured to reconstruct samples of the chroma component based on prediction samples of the chroma component and the derived chroma residual data.

20 Claims, 12 Drawing Sheets

Related U.S. Application Data

(60) Provisional application No. 63/461,582, filed on Apr. 24, 2023.

(51) Int. Cl.

| | |
|---|---|
| ***H04N 19/132*** | (2014.01) |
| ***H04N 19/172*** | (2014.01) |
| ***H04N 19/176*** | (2014.01) |
| ***H04N 19/186*** | (2014.01) |
| ***H04N 19/50*** | (2014.01) |
| ***H04N 19/70*** | (2014.01) |

(52) U.S. Cl.
CPC ......... *H04N 19/172* (2014.11); *H04N 19/176* (2014.11); *H04N 19/186* (2014.11); *H04N 19/70* (2014.11)

(58) Field of Classification Search
CPC ...... H04N 19/186; H04N 19/70; H04N 19/11; H04N 19/593
See application file for complete search history.

(56) References Cited

U.S. PATENT DOCUMENTS

| | | | | |
|---|---|---|---|---|
| 2023/0106614 | A1* | 4/2023 | Li ........................ | H04N 19/159<br>375/240.12 |
| 2024/0236315 | A1* | 7/2024 | Choi .................... | H04N 19/117 |
| 2024/0357097 | A1* | 10/2024 | Chen .................... | H04N 19/105 |
| 2026/0181136 | A1* | 6/2026 | Kalantzis ............. | H04N 19/119 |

* cited by examiner

CROSS-COMPONENT RESIDUAL PREDICTION BY USING PREDICTION SAMPLE

INCORPORATION BY REFERENCE

The present application is a continuation of International Application No. PCT/US2024/025850, filed on Apr. 23, 2024, which claims the benefit of priority to U.S. Provisional Application No. 63/461,582, filed on Apr. 24, 2023. The entire disclosures of the prior applications are hereby incorporated herein by reference in their entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include bitstreams, methods, and apparatuses for video encoding/decoding. In some examples, an apparatus for video encoding/decoding includes processing circuitry.

According to an aspect of the disclosure, a method of processing visual media data is provided. In the method, a bitstream of the visual media data is processed according to a format rule. In an example, the bitstream includes a syntax element of a current block in a current picture. The current block includes a luma component and a chroma component. The format rule specifies that the syntax element is included in the bitstream for the current block when a cross-component residual model (CCRM) is not applied to the current block. The syntax element indicates whether a prediction sample domain cross-component residual model (P-CCRM) is applied to the current block. When the syntax element indicates that the P-CCRM is applied to the current block, the format rule specifies that filter coefficients of a filter are derived based on prediction samples of the luma component and prediction samples of the chroma component. The format rule specifies that the filter coefficients of the filter are applied to luma residual data of the luma component. The format rule specifies that chroma residual data of the chroma component is derived based on the luma residual data of the luma component to which the filter coefficients of the filter are applied. The format rule specifies that samples of the chroma component are processed based on the prediction samples of the chroma component and the derived chroma residual data of the chroma component.

In an example, the format rule specifies that the syntax element is included in the bitstream when the chroma component of the current block is coded based on one of a derived model (DM) and a cross-component model. The cross-component model includes one of a cross-component linear model (CCLM), a multi-model linear model (MMLM), a convolutional cross-component intra prediction model (CCCM), and a gradient linear model (GLM).

In an example, the format rule specifies that the syntax element is included in the bitstream when (i) the chroma component of the current block is coded based on one of an inter mode, an intra block copy (IBC) mode, and an intra template matching prediction (intraTMP) mode and (ii) a cross-component residual model (CCRM) is not applied to the current block.

In an example, the format rule specifies that, when the syntax element indicates that the P-CCRM is not applied to the current block, another syntax element is included in the bitstream, where the other syntax element indicates whether the CCRM is applied to the current block.

In an example, the format rule specifies that the syntax element includes a first syntax element that indicates whether the P-CCRM is applied to a Cb component of the chroma component and a second syntax element that indicates whether the P-CCRM is applied to a Cr component of the chroma component.

According to another aspect of the disclosure, a method of video encoding is provided. In the method, whether a P-CCRM is applied to a current block in a current picture is determined. The current block includes a luma component and a chroma component. When the P-CCRM is determined to be applied to the current block, filter coefficients of a filter are derived based on prediction samples of the luma component and prediction samples of the chroma component. The filter coefficients of the filter are applied on luma residual data of the luma component. Chroma residual data of the chroma component is derived based on the luma residual data of the luma component to which the filter coefficients of the filter are applied. Samples of the chroma component are encoded in a bitstream based on the prediction samples of the chroma component and the derived chroma residual data of the chroma component. Syntax element is encoded in the bitstream, where the syntax element indicates whether the P-CCRM is applied to the current block.

In an example, whether the P-CCRM is applied to the current block is determined when the chroma component of the current block is coded based on one of a derived model (DM) and a cross-component model. The cross-component model includes one of a cross-component linear model (CCLM), a multi-model linear model (MMLM), a convolutional cross-component intra prediction model (CCCM), and a gradient linear model (GLM).

In an example, whether the P-CCRM is applied to the current block is determined when (i) the chroma component of the current block is coded based on one of an inter mode, an intra block copy (IBC) mode, and an intra template matching prediction (intraTMP) mode and (ii) a cross-component residual model (CCRM) is not applied to the current block.

In an example, when the P-CCRM is determined not to be applied to the current block, another syntax element is encoded in the bitstream, where the other syntax element indicates whether the CCRM is applied to the current block.

According to yet another aspect of the disclosure, an apparatus of video decoding is provided. The apparatus includes processing circuitry. The processing circuitry is configured to receive a bitstream that includes syntax information for a current block. The syntax information indicates whether a P-CCRM is applied to the current block. The current block includes a luma component and a chroma component. When the syntax information indicates that the P-CCRM is applied to the current block, the processing circuitry is configured to derive chroma residual data of the chroma component based on luma residual data of the luma component. The processing circuitry is configured to reconstruct samples of the chroma component based on prediction samples of the chroma component and the derived chroma residual data.

In an example, the processing circuitry is configured to derive filter coefficients of a filter based on prediction samples of the luma component and the prediction samples of the chroma component. The processing circuitry is configured to apply the filter coefficients of the filter to the luma residual data of the luma component. The processing circuitry is configured to derive the chroma residual data based on the luma residual data of the luma component to which the filter coefficients of the filter is applied.

In an example, the syntax information is included in the bitstream when the chroma component of the current block is coded based on one of a derived model (DM) and a cross-component model. The cross-component model includes one of a cross-component linear model (CCLM), a multi-model linear model (MMLM), a convolutional cross-component intra prediction model (CCCM), and a gradient linear model (GLM).

In an example, the syntax information is included in the bitstream when (i) the chroma component of the current block is coded based on one of an inter mode, an intra block copy (IBC) mode, and an intra template matching prediction (intraTMP) mode and (ii) a cross-component residual model (CCRM) is not applied to the current block.

In an example, when the syntax information indicates that the P-CCRM is not applied to the current block, the bitstream includes another syntax information that indicates whether the CCRM is applied to the current block.

In an example, the syntax information includes a first syntax element that indicates whether the P-CCRM is applied to a Cb component of the chroma component and a second syntax element that indicates whether the P-CCRM is applied to a Cr component of the chroma component.

In an example, the processing circuitry is configured to derive the filter coefficients of the filter based on one of a cross-component linear model (CCLM), a multi-model linear model (MMLM), a convolutional cross-component intra prediction model (CCCM), and a gradient linear model (GLM).

In an example, the processing circuitry is configured to derive the filter coefficients of the filter for a Cb component of the chroma component and the filter coefficients of the filter for a Cr component of the chroma component.

In an example, the processing circuitry is configured to, when the filter coefficients of the filter are not derivable for a Cb component of the chroma component, set the chroma residual data as zero for the Cb component.

In an example, the processing circuitry is configured to, when the filter coefficients of the filter are not derivable for a Cr component of the chroma component, set the chroma residual data as zero for the Cr component.

In an example, the processing circuitry is configured to, when the chroma component of the current block is coded based on a cross-component model, derive filter coefficients of a filter based on the cross-component model. The processing circuitry is configured to apply the filter coefficients of the filter on the luma residual data of the luma component. The processing circuitry is configured to derive the chroma residual data based on the luma residual data of the luma component to which the filter coefficients of the filter are applied.

Aspects of the disclosure also provide an apparatus for video encoding. The apparatus for video encoding including processing circuitry configured to implement any of the described methods for video encoding.

Aspects of the disclosure also provide a method for video decoding. The method including any of the methods implemented by the apparatus for video decoding.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
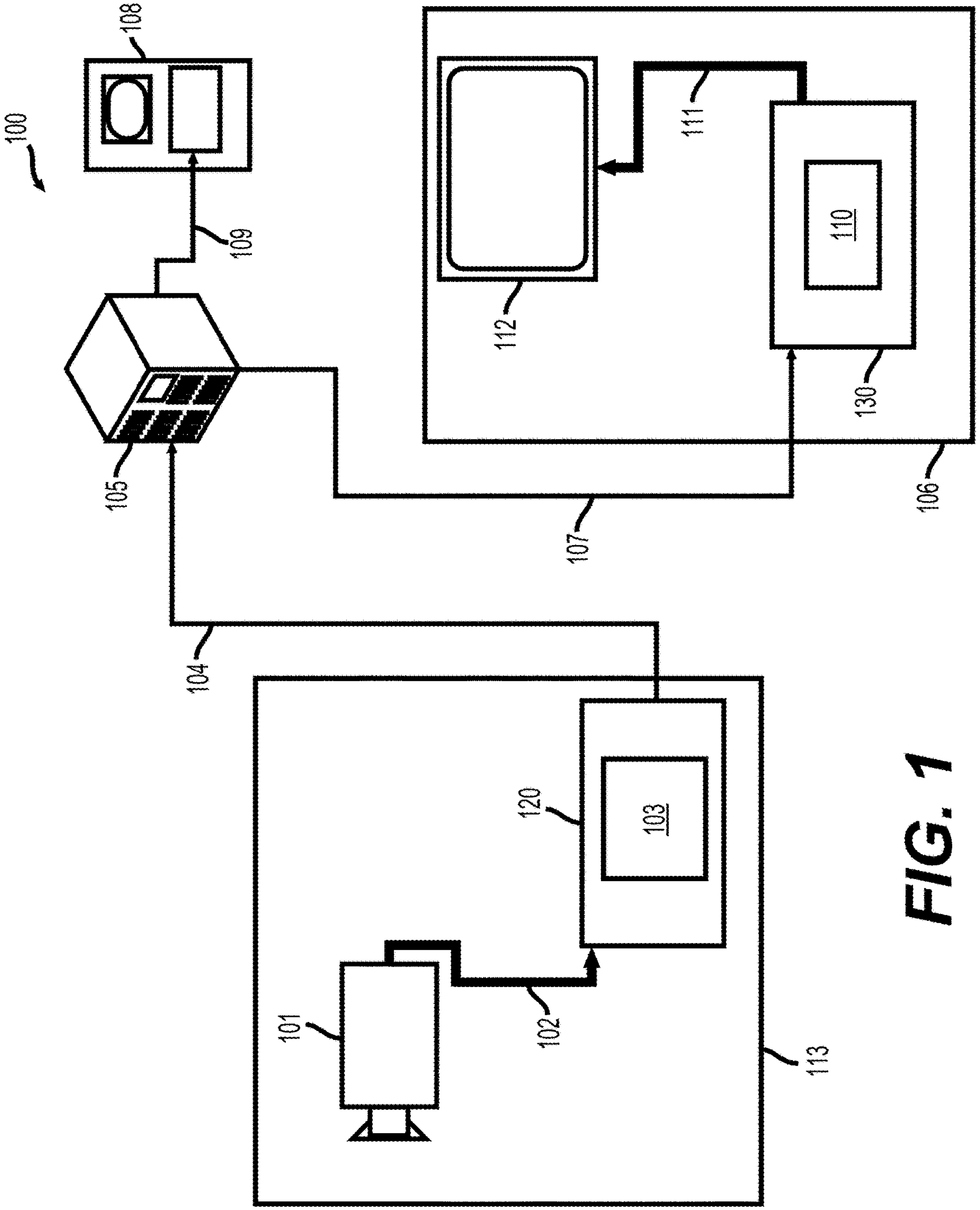
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
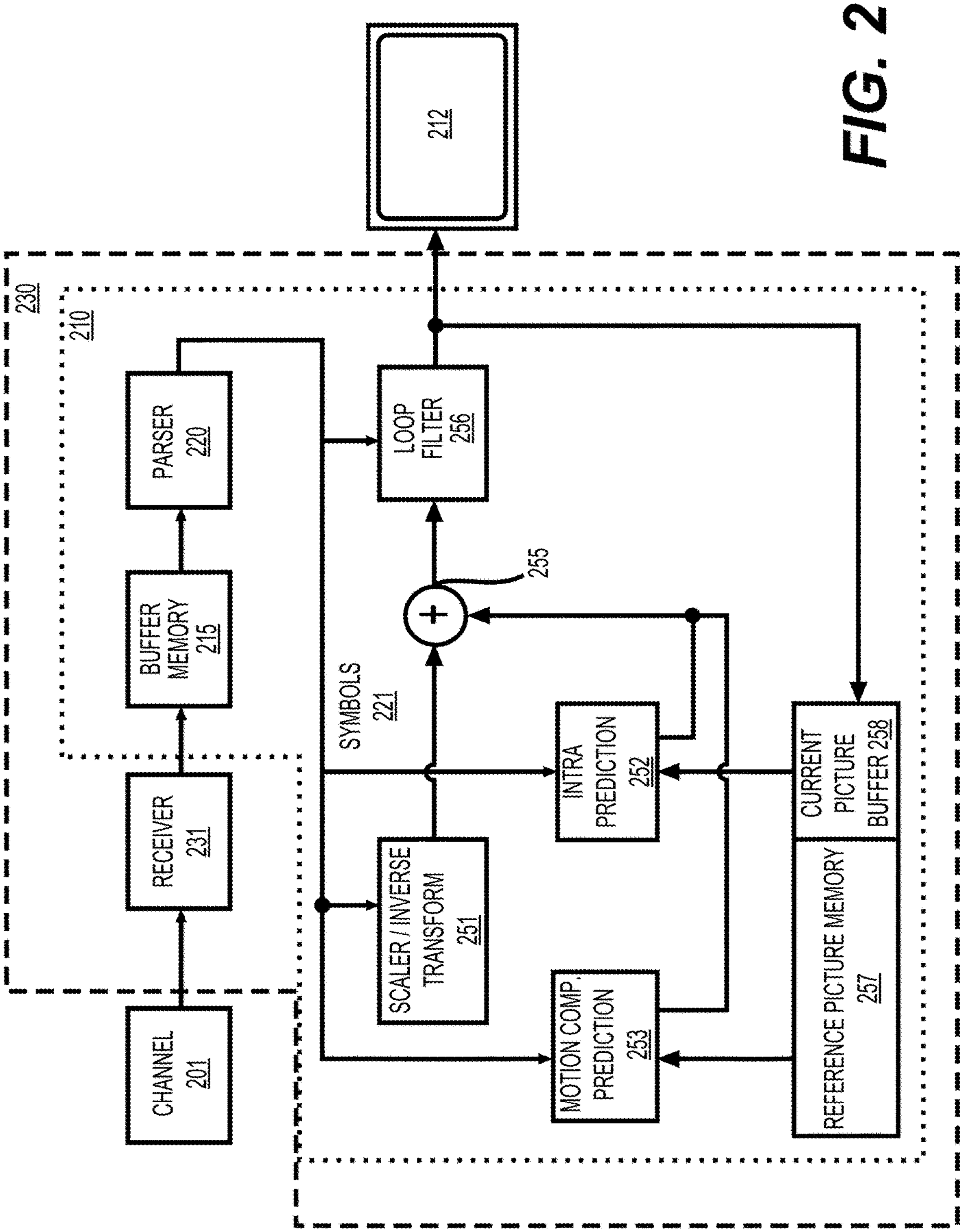
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
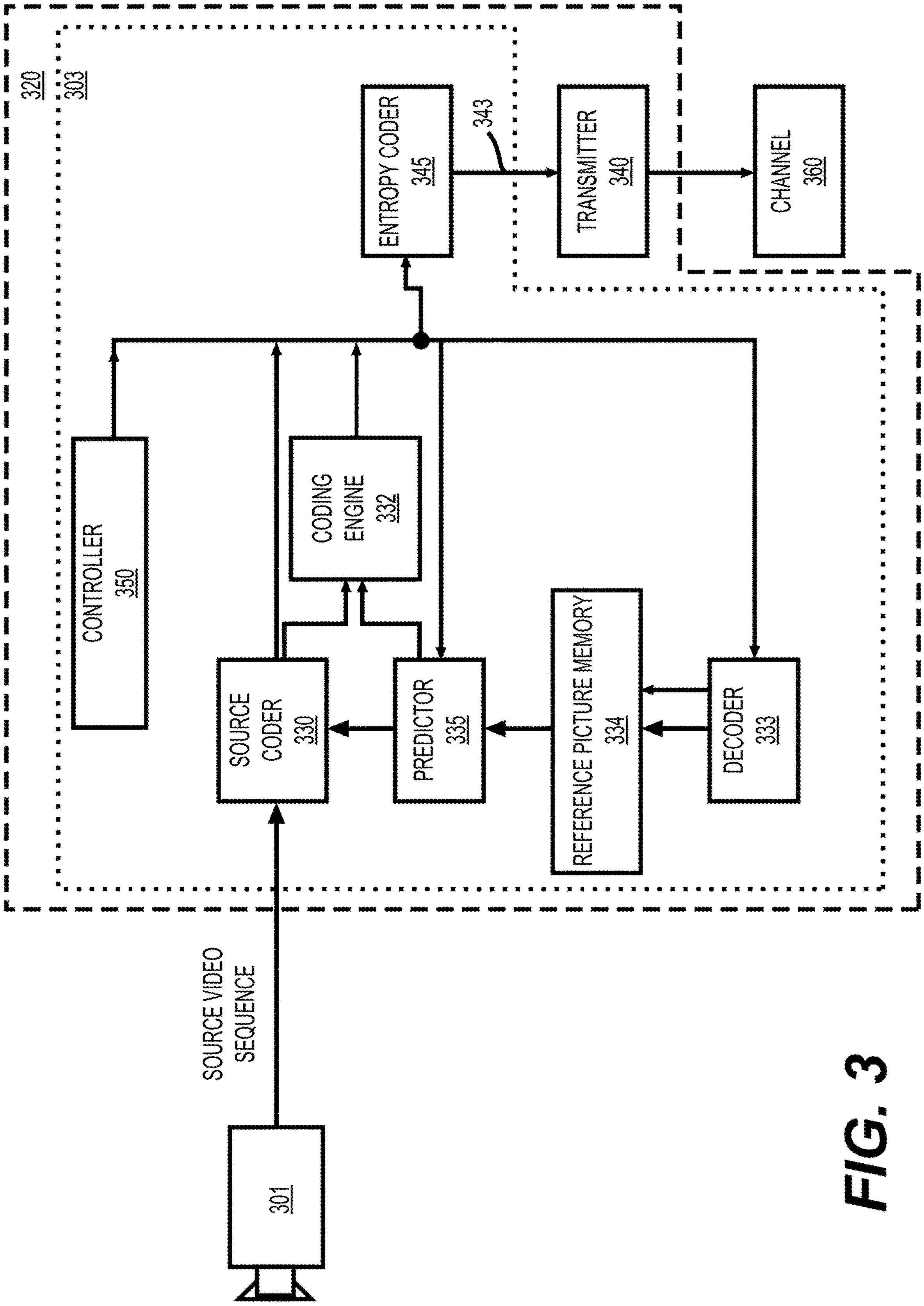
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Aspects of the disclosure includes techniques for improving local illumination compensation.

In an aspect, to reduce a cross-component redundancy, a cross-component linear model (CCLM) prediction mode may be used. In the CCLM, chroma samples of a coding unit (CU) may be predicted based on reconstructed luma samples of the CU by using a linear model according to equation (1) as follows:

$$pred_C(i, j) = \alpha \cdot rec'_L(i, j) + \beta \qquad \text{Eq. (1)}$$

where $pred_C(i, j)$ may represent predicted chroma samples in a CU and $rec_L(i, j)$ may represent downsampled reconstructed luma samples of the CU.

CCLM parameters, such as α and β, may be derived through at most four neighbouring chroma samples and down-sampled luma samples corresponding to the neighboring chroma samples. When chroma block dimensions of a current chroma block are W×H, then W" and H' may be set as follows:

(1) W'=W, H'=H when LM mode is applied;

(2) W'=W+H when LM-A mode is applied; and (3) H'=H+W when LM-L mode is applied

The neighbouring positions described above may be denoted as S[0, −1] . . . S[W'−1, −1] and the left neighbouring positions may be denoted as S[−1, 0] . . . S[−1, H'−1]. Thus, the four neighboring samples may be selected as follows:

(1) S[W'/4, −1], S[3*W'/4, −1], S[−1, H'/4], S[−1, 3*H'/4] when LM mode is applied and both above and left neighbouring samples are available;

(2) S[W'/8, −1], S[3*W'/8, −1], S[5*W'/8, −1], S[7*W'/8, −1] when LM-A mode is applied or only the above neighbouring samples are available; and (3) S[−1, H'/8], S[−1, 3*H'/8], S[−1, 5*H'/8], S[−1, 7*H'/8] when LM-L mode is applied or only the left neighbouring samples are available.

The four neighbouring luma samples at the selected positions may be down-sampled and compared four times to find two larger values: $x^0_A$ and $x^1_A$, and two smaller values: $x^0_B$ and $x^1_B$. Chroma sample values corresponding to the two larger values and the smaller values may be denoted as $y^0_A$, $y^1_A$, $y^0_B$ and $y^1_B$ respectively. Further, $x_A$, $x_B$, $y_A$ and $y_B$ may be derived as follows in equations (2)-(5):

$$X_a = (x^0_A + x^1_A + 1) \gg 1 \quad \text{Eq. (2)}$$

$$X_b = (x^0_B + x^1_B + 1) \gg 1 \quad \text{Eq. (3)}$$

$$Y_a = (y^0_A + y^1_A + 1) \gg 1 \quad \text{Eq. (4)}$$

$$Y_b = (y^0_B + y^1_B + 1) \gg 1 \quad \text{Eq. (5)}$$

Finally, the linear model parameters α and β may be obtained according to equations (6) and (7) as follows:

$$\alpha = \frac{Y_a - Y_b}{X_a - X_b} \quad \text{Eq. (6)}$$

$$\beta = Y_b - \alpha \cdot X_b \quad \text{Eq. (7)}$$

In an aspect, the CCLM may be extended by adding three Multi-model LM (MMLM) modes. In each MMLM mode, reconstructed neighboring samples may be classified into two classes using a threshold that may be an average of luma reconstructed neighboring samples. The linear model of each class may be derived using a Least-Mean-Square (LMS) method. For the CCLM mode, the LMS method may also be used to derive the linear model. A slope adjustment may be applied to the CCLM and to the MMLM. The adjustment may tilt a linear function which maps luma values to chroma values with respect to a center point determined by an average luma value of the reference samples.

In an aspect, a convolutional cross-component model (CCCM) may be applied to predict chroma samples from reconstructed luma samples, which is like the CCLM. Similar to the CCLM, the reconstructed luma samples may be down-sampled to match a lower resolution chroma grid when chroma sub-sampling is used. Similar to the CCLM, reference samples, such as top, left, or top and left reference samples, may be used as templates for model derivation.

Also, similar to the CCLM, the CCCM may have a single model variant or a multi-model variant. The multi-model variant may use two models that include one model derived for samples above an average luma reference value and another model for the rest of the samples (e.g., samples equal to or below the average luma reference value). Multi-model CCCM mode may be selected for prediction units (Pus) which may have at least 128 reference samples available.

Figure 4:
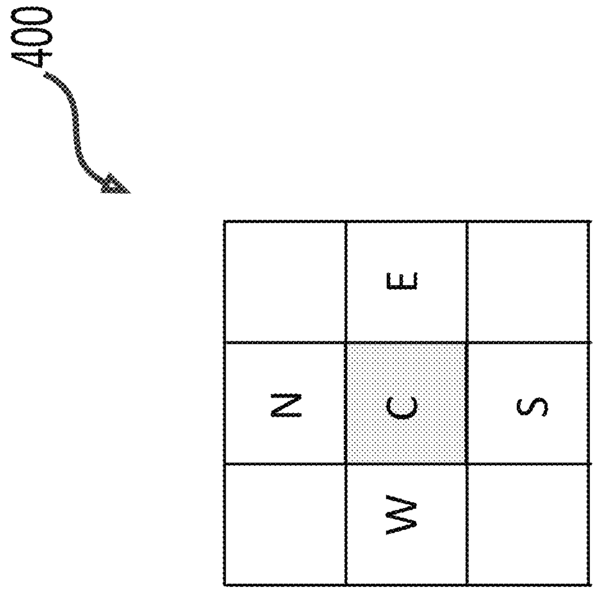
FIG. 4 is a schematic illustration of a spatial part of a convolutional filter.

A convolutional filter may be applied to the CCCM. The convolutional filter may be a 7-tap filter that includes a 5-tap plus a sign shape spatial component, a nonlinear term, and a bias term. An input to the spatial 5-tap component of the filter may include a center (C) luma sample which is collocated with a chroma sample to be predicted and neighboring samples of the center luma sample, such as above/north (N), below/south (S), left/west (W) and right/east (E) neighbors. An example of a spatial 5-tap component of a filter can be shown in FIG. 4.

The nonlinear term P may be represented as a power of two of the center luma sample C and scaled to a sample value range of content of a bit (or bit depth) as follows in equation (8):

$$P = (C * C + midVal) \gg bitDepth \quad \text{Eq. (8)}$$

That is, for a 10-bit content, the nonlinear term P may be calculated as follows in equation (9):

$$P = (C * C + 512) \gg 10 \quad \text{Eq. (9)}$$

The bias term B may represent a scalar offset between the input and an output (similar to the offset term in the CCLM) and may be set to a middle chroma value (e.g., 512 for a 10-bit content). The output of the filter may be calculated as a convolution between filter coefficients $c_i$ and the input values and clipped to a range of valid chroma samples according to equation (10):

$$predChromaVal = c_0C + c_1N + c_2S + c_3E + c_4W + c_5P + c_6B \quad \text{Eq. (10)}$$

Figure 5:
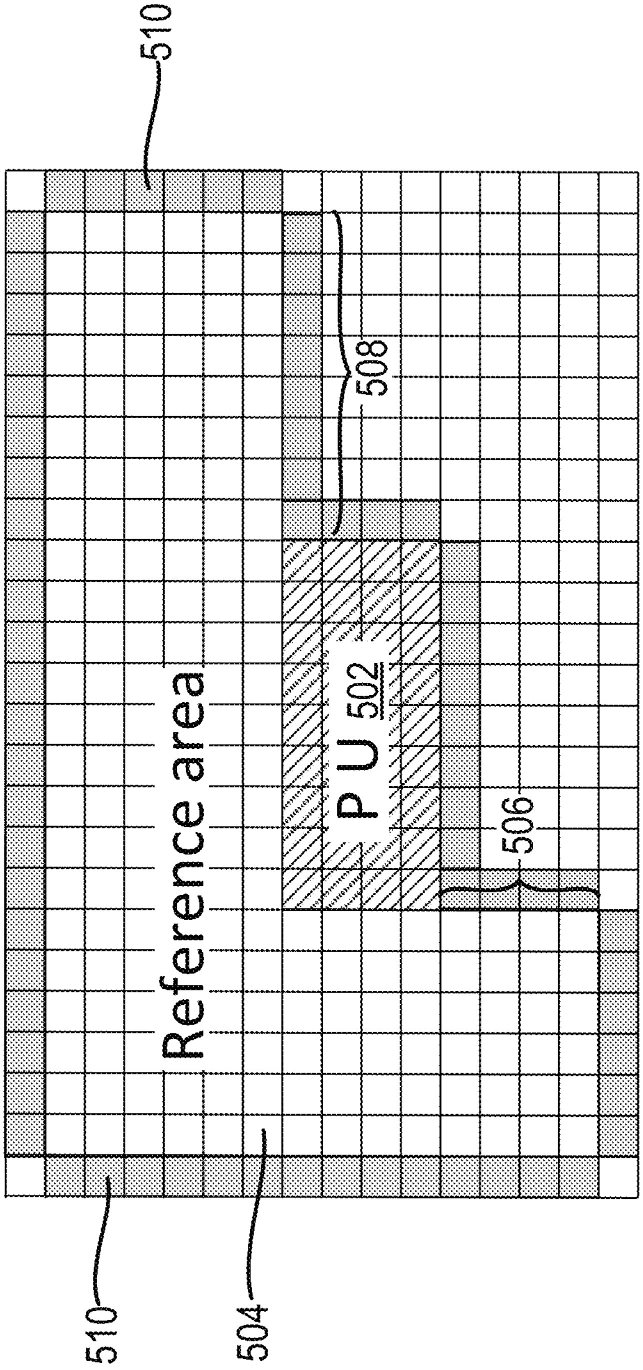
FIG. 5 is a schematic illustration of a reference area used to derive filter coefficients.

The filter coefficients $c_i$ may be calculated by minimizing MSE between predicted chroma samples and reconstructed chroma samples in a reference area. FIG. 5 illustrates a reference area (504) of a PU (502). The reference area (504) may include 6 lines of chroma samples above and to the left of the PU (502). The reference arca (504) may extend one PU width (508) to a right PU boundary and one PU height (506) below a bottom PU boundary. The reference area (504) may be adjusted to include only available samples. In an example, the filter area (504) may include extensions (510). The extensions (510) of the filter area (504) shown in FIG. 5 can support "side samples" of a plus shaped spatial filter (e.g., (400)) and may be padded in unavailable areas.

The MSE minimization may be performed by calculating an autocorrelation matrix for the luma input and a cross-correlation vector between the luma input and the chroma output. The autocorrelation matrix may be LDL decomposed and the final filter coefficients may be calculated using a back-substitution. In an example, the calculation process may follow roughly the calculation of the ALF filter coefficients in ECM. However, an LDL decomposition may be chosen instead of a Cholesky decomposition to avoid using square root operations.

The autocorrelation matrix may be calculated using the reconstructed values of luma and chroma samples. The reconstructed luma and chroma samples may be in a full range (e.g., between 0 and 1023 for a 10-bit content), which may result in relatively large values in the autocorrelation matrix. Accordingly, a high bit depth operation may be required during the model parameters calculation. In an example, fixed offsets may be removed from the luma and chroma samples in each PU for each model. Accordingly, magnitudes of the values used may be reduced in the model creation and a precision needed for the fixed-point arithmetic may be driven down. As a result, a 16-bit decimal precision may be applied instead of a 22-bit precision in the original CCCM implementation.

Reference sample values just outside of a top-left corner of a PU may be used as offsets (e.g., offsetLuma, offsetCb, and offsetCr) for simplicity. Sample values used in both a model creation and a final prediction (e.g., luma and chroma in the reference area, and luma in a current PU) may be reduced by fixed values in equations (11)-((15), as follows:

$$C' = C - offsetLuma \quad \text{Eq. (11)}$$

$$N' = N - offsetLuma \quad \text{Eq. (12)}$$

$$S' = S - offsetLuma \quad \text{Eq. (13)}$$

$$E' = E - offsetLuma \quad \text{Eq. (14)}$$

$$W' = W - offsetLuma \quad \text{Eq. (15)}$$

The nonlinear term P and the bias term B may be defined in equations (16) and (17) as follows:

$$P' = nonLinear(C') \quad \text{Eq. (16)}$$

$$B = midValue = 1 \ll (bitDepth - 1) \quad \text{Eq. (17)}$$

The chroma value may be predicted using equation (18), where offsetChroma may be equal to offsetCr and offsetCb for Cr and Cb components, respectively:

$$predChromaVal = c_0C' + c_1N' + c_2S' + c_3E' + c_4W' + c_5P' + c_6B + offsetChroma \quad \text{Eq. (18)}$$

In order to avoid any additional sample level operations, the luma offset may be removed during the luma reference sample interpolation. The luma offset may be removed by substituting a rounding term used in the luma reference sample interpolation with an updated offset including both the rounding term and the offsetLuma. The chroma offset may be removed by deducting the chroma offset directly from the reference chroma samples. As an alternative way, an impact of the chroma offset may be removed from the cross-component vector to give an identical result. In order to add the chroma offset back to the output of the convolutional prediction operation, the chroma offset may be added to the bias term B of the convolutional model.

The parameter calculation of the CCCM model may require division operations. The division operations may not always be considered as a friendly implementation. The division operations may be replaced with a multiplication (with a scale factor) and shift operation, where a scale factor and a number of shifts may be calculated based on a denominator similar to the parameter calculation of the CCLM model.

For a color format, such as a YUV 4:2:0 color format, a gradient linear model (GLM) method may be used to predict chroma samples from a luma sample gradients. The GLM may include two modes: a two-parameter GLM mode and a three-parameter GLM mode.

Compared with the CCLM, the two-parameter GLM utilizes luma sample gradients to derive the linear model instead of down-sampled luma values. In an example, when the two-parameter GLM mode is applied, an input to the CCLM process, e.g., down-sampled luma samples L, may be replaced by luma sample gradients G. Oher parts of the CCLM (e.g., parameter derivation, prediction sample linear transform) may be kept unchanged. Accordingly, chroma samples C can be derived based on a luma sample gradients G as follows in equation (19):

$$C = \alpha \cdot G + \beta \quad \text{Eq. (19)}$$

where α and β are factors, and G are luma sample gradients.

In the three-parameter GLM, a chroma sample may be predicted based on both the luma sample gradients G and down-sampled luma values L with different parameters. The model parameters of the three-parameter GLM may be derived from 6 rows and columns of adjacent samples by the LDL decomposition based MSE minimization method as used in the CCCM. An example of the three-parameter GLM may be shown in equation (20):

$$C = \alpha_0 \cdot G + \alpha_1 \cdot L + \alpha_2 \cdot \beta \quad \text{Eq. (20)}$$

Figure 6:
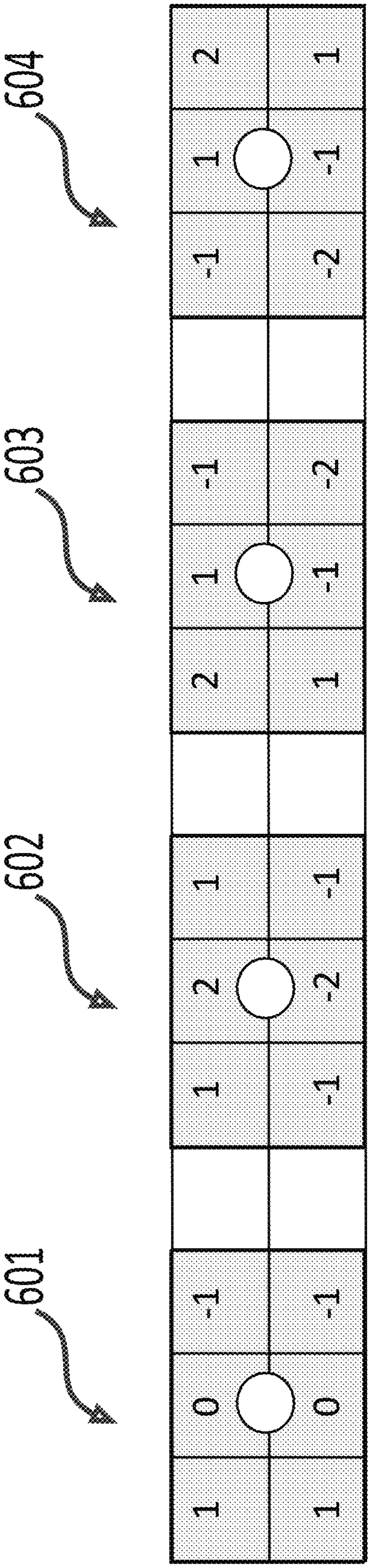
FIG. 6 is a schematic illustration of four Sobel based gradient patterns for a gradient linear model (GLM).

For signaling, when the CCLM mode is enabled to the current CU, one flag may be signaled to indicate whether the GLM is enabled for both Cb and Cr components. If the GLM is enabled, another flag may be signaled to indicate which of the two GLM modes is selected. One syntax element may be further signaled to select one of 4 gradient filters for the gradient calculation. Four gradient filters (601)-(604) may be enabled for the GLM, as illustrated in FIG. 6.

Intra block copy (IBC) is a tool adopted in HEVC extensions on screen content coding (SCC). The IBC can significantly improve a coding efficiency of screen content materials. Since the IBC mode is implemented as a block level coding mode, block matching (BM) may be performed at an encoder to find an optimal block vector (or a motion vector) for each CU. Here, a block vector may be used to indicate a displacement from a current block to a reference block. The reference block may already be reconstructed inside the current picture. The luma block vector of an IBC-coded CU may be in an integer precision. The chroma block vector may round to the integer precision as well. When combined with AMVR, the IBC mode may switch between 1-pel and 4-pel motion vector precisions. An IBC-coded CU may be treated as the third prediction mode other than intra or inter prediction modes. The IBC mode may be applicable to the CUs with both a width and a height smaller than or equal to a threshold, such as 64 luma samples.

At the encoder side, a hash-based motion estimation may be performed for IBC. The encoder may perform a RD check for blocks with either a width or a height no larger than 16 luma samples. For a non-merge mode, the block vector search may be performed using the hash-based search first. If the hash-based search does not return a valid candidate, a block matching based local search may be performed.

In the hash-based search, hash key matching (e.g., 32-bit CRC) between the current block and a reference block may be extended to all allowed block sizes. The hash key calculation for every position in the current picture may be based on subblocks, such as 4×4 subblocks. For the current block of a larger size, a hash key may be determined to match a hash key of the reference block when all the hash keys of all 4×4 subblocks match the hash keys in the corresponding reference locations. If hash keys of multiple reference blocks are found to match the hash key of the current block, the block vector costs of each matched reference may be calculated and one of the block vectors costs with a minimum cost is selected.

In the block matching search, the search range may be set to cover both the previous and current CTUs. At a CU level, the IBC mode may be signalled with a flag. The IBC mode may be signaled as an IBC AMVP mode or an IBC skip/merge mode. In the IBC skip/merge mode, a merge candidate index may be used to indicate which of the block vectors in the list from neighboring candidate IBC coded blocks is used to predict the current block. The merge list may include spatial, HMVP, and pairwise candidates. In the IBC AMVP mode, a block vector difference may be coded in a same way as a motion vector difference. The block vector prediction method may use two candidates as predictors: one from a left neighbor and one from an above neighbor (if IBC coded). When either neighbor is not available, a default block vector may be used as a predictor. A flag may be signaled to indicate the block vector predictor index.

Figure 7:
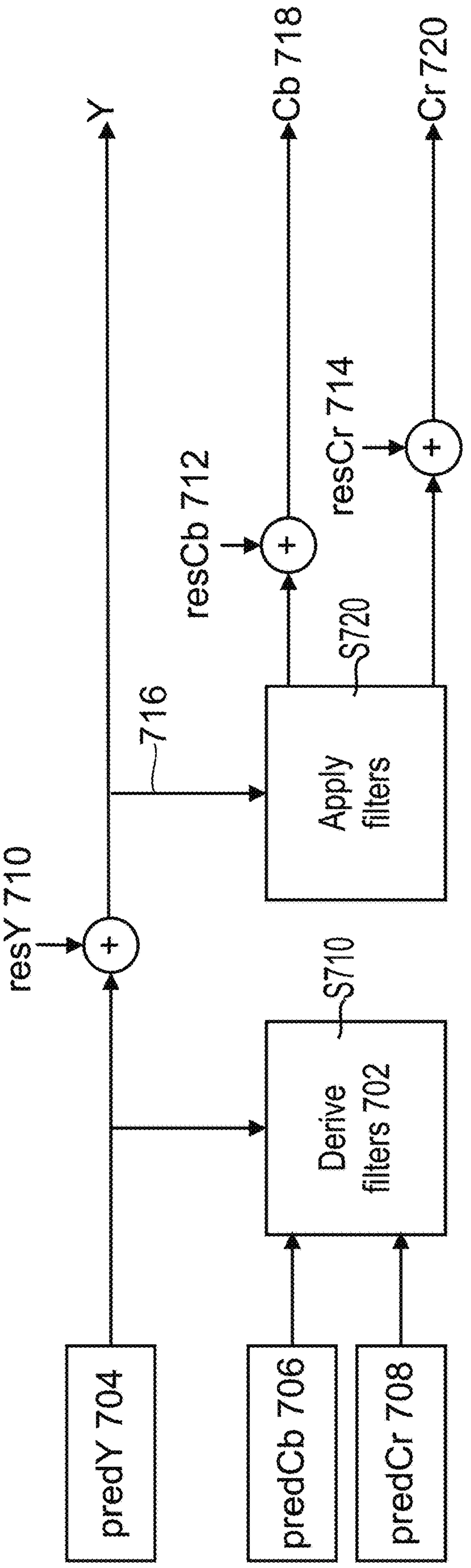
FIG. 7 is a schematic illustration of a cross-component residual model (CCRM) according to some aspects of the disclosure.

In an aspect, a cross-component residual model (CCRM) predicts chroma samples of a block from reconstructed luma samples of the block when the block uses inter prediction or intra block copy (IBC). FIG. 7 illustrates a decoder side of the CCRM method. As shown in FIG. 7, cross-component filters (702) may be derived at step (S710) using prediction signals of luma and chroma, such as predY (704), predCb (706), and predCr (708). The derived filters may be applied at step (S720) to a reconstructed luma signal (716) to produce final chroma predictions that include a Cb component (718) and a Cr component (720). The reconstructed luma signal may be determined as a sum of the prediction signal of luma (e.g., predY (704)) and residual data of luma (e.g., resY (710)). The Cb (718) may be determined as a sum of a filtered luma signal generated at the step (S720) and residual data of Cb (e.g., resCb (712)). The Cr (720) may be determined as a sum of the filtered luma signal generated at the step (S720) and residual date of Cr (e.g., resCr (714)).

Figure 8:
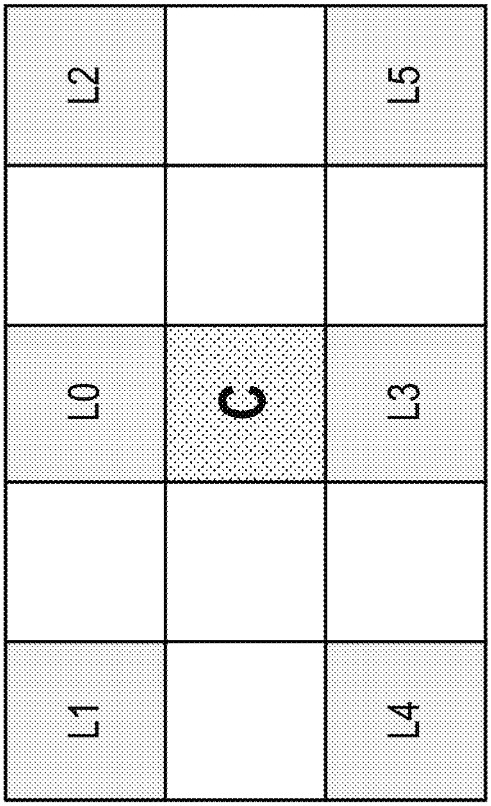
FIG. 8 is a schematic illustration of a calculation of filter coefficients in CCRM according to some aspects of the disclosure.

In an aspect, as shown in FIG. 8, an 8-tap filter may be applied to CCRM that may include 6 spatial luma samples L0-L5, a nonlinear term, and a bias term. The spatial luma samples (e.g., L0, . . . , and L5) may be obtained from a luma grid by selecting the 6 luma samples L0-L5 closest to a chroma position C without down sampling. A predicted chroma value may be obtained in equation (21) as follow:

$$predChromaVal = c_0L0 + c_1L1 + c_2L2 + c_3L3 + c_4L4 + c_5L5 + c_6\ \text{nonlinear}((L0 + L3 + 1) \gg 1) + c_7B \quad \text{Eq. (21)}$$

where nonlinear ( ) is a nonlinear operator, such as a nonlinear operator of convolutional cross-component model (CCCM), and B is a bias. In an example, the nonlinear operator in equation (21) can be defined as follows in equation (22):

$$NonLinear\ (C) = (C * C + midVal) \gg bitDepth \quad \text{Eq. (22)}$$

where C is a center luma sample.

Still referring to FIG. 8, the filter coefficients may be derived using a division-free Gaussian elimination method and necessary offsets may be applied to samples prior to the filter derivation. Intra reference samples may be used as additional input samples in the filter derivation when the block has less than 64 chroma samples. In an example, a filter design of CCCM may include at most 6 rows and columns of intra reference samples. Thus, blocks having 256 chroma samples or more may be divided into subblocks that have at most 256 chroma samples. Subblocks containing a zero luma residual may be skipped. Usage of the CCRM mode may be signalled as a CABAC coded TU level flag. A new CABAC context may be included to support signaling of the flag. The CCRM flag may only be signalled if luma CBf of a TU (or transform unit) is non-zero and a prediction mode of the CU is either an inter prediction mode (e.g., MODE_INTER) or IBC mode (e.g., MODE_IBC).

As described above, the CCRM is provided to predict chroma samples of coded block from reconstructed luma samples of the coded block when the coded block is coded by an inter prediction or an IBC. The reconstructed luma sample may be used to predict a chroma predictor and may be a kind of Inter-CCCM. In an example, a block coded by the CCRM may not include cross-component filtering on a residual domain to predict a residual data of a chroma component by using a residual data from a luma component.

Figure 9:
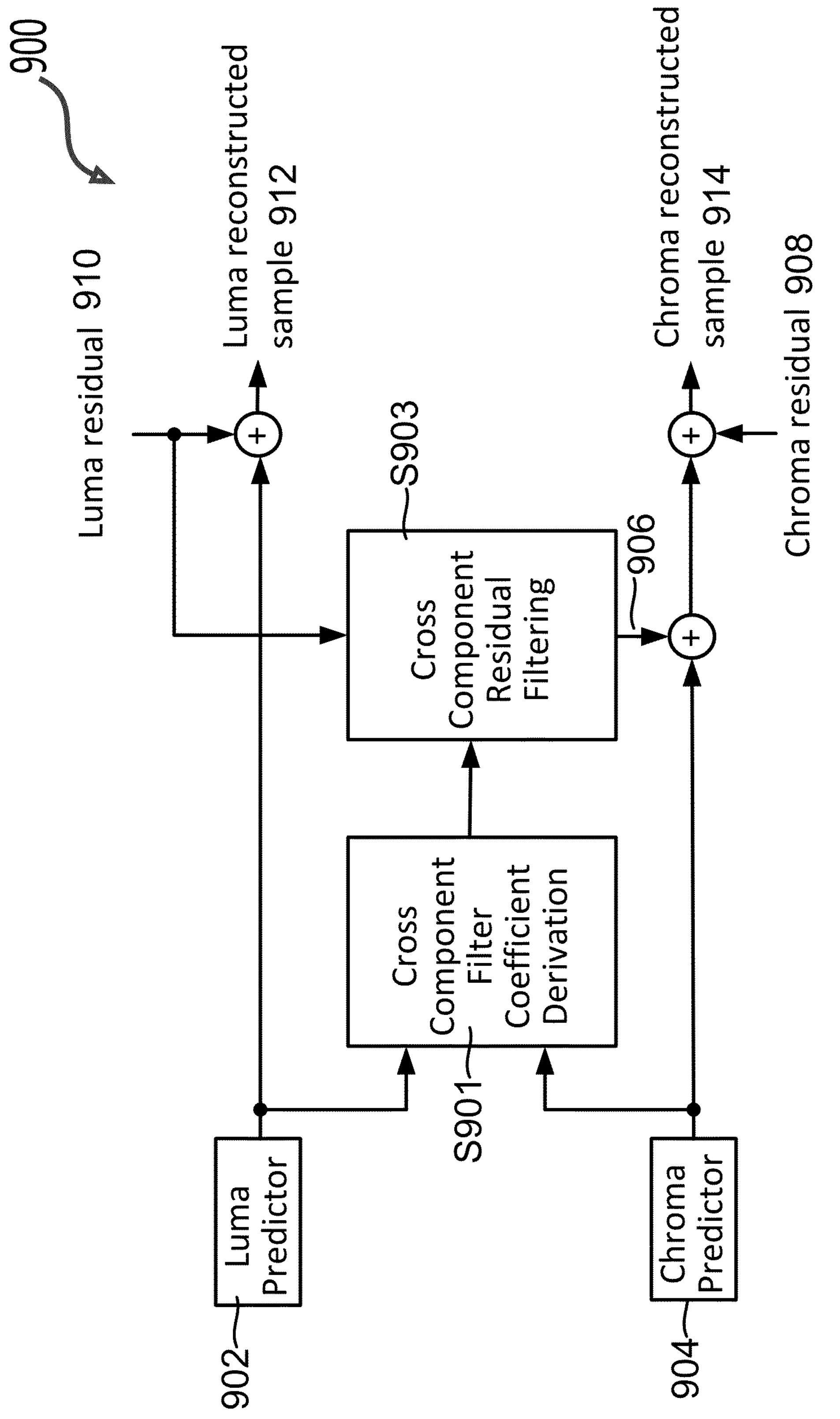
FIG. 9 is a schematic illustration of a prediction sample domain cross-component residual model (P-CCRM).

In an aspect, a prediction sample domain cross-component residual model (P-CCRM) is provided. In the P-CCRM, prediction samples from both a luma component and a chroma component may be applied to derive a filter coefficient. The filter coefficient may be applied on luma residual data of the luma component to predict a chroma residual data of the component. A final chroma predictor may be derived based on the predicted chroma residual data and a chroma predictor. FIG. 9 shows an example of a block diagram of the P-CCRM (900) in a decoder.

As shown in FIG. 9, a luma predictor (902) and a chroma predictor (904) of a block can be applied at step (S901) to derive a filter coefficient of a filter, such as a cross-component filter coefficient of a cross-component filter. In an example, the luma predictor (902) and the chroma predictor (904) can be obtained based on any suitable prediction modes, such as an inter prediction mode, an intra prediction mode, an IBC mode, a cross-component mode (e.g., CCLM, MMLM, CCCM, GLM), or the like. The cross-component filter coefficient can be derived based on any one of the cross-component modes. For example, the cross-component filter coefficient can be derived based on one of the CCLM, MMLM, CCCM, and GLM. For example, the cross-component filter coefficient can be derived based on CCCM according to descriptions of FIG. 5. The derived cross-component filter coefficient can be applied at step (S903) on a luma residual (910) of the luma component of the block. At step (903), cross-component residual filtering can be performed by filtering the luma residual (910) based on the derived cross-component filter coefficient to derive a chroma residual (906). In an example, another chroma residual (908), which can be a difference between an initial chroma residual and the derived chroma residual (906), may be provided. The initial chroma residual may be a difference between the chroma component and the chroma predictor (904). In an example, a chroma reconstructed sample (914) of the chroma component may be determined based on a sum of the chroma predictor (904) and the derived chroma residual (906). A luma reconstructed sample (912) may be determined as a sum of the luma predictor (902) and the luma residual (910). In an example, the chroma reconstructed sample (914) may be determined as a sum of the chroma predictor (904), the derived chroma residual (906), and the other chroma residual (908).

In an aspect, a syntax element or other coded information, such as a flag, may be signaled to indicate whether the P-CCRM is applied or not on a chroma component of a coded block. The coded block may be coded in an intra prediction mode, an inter prediction mode, an IBC mode, or any other suitable prediction modes.

In an aspect, a syntax element or other coded information, such as a flag, may be signaled to indicate whether the P-CCRM is applied on a chroma component of a coded block for certain coding types. For example, the syntax element or other coded information, such as the flag, may be signaled to indicate whether the P-CCRM is applied on a chroma component of a coded block when an intra prediction mode on the chroma component is coded by DM (or derived mode) or a cross-component model. The cross-component model (or mode) may include one of CCLM, MMLM, CCCM, GLM, and/or other cross-component modes. Otherwise, when the chroma component is not coded by the DM or the cross-component mode, the flag of P-CCRM may be inferred as 0 (or false).

In an aspect, a syntax element or other coded information (e.g., flag information), such as a flag, may be signaled to indicate whether the P-CCRM is applied or not when a coded block is coded in certain prediction modes, such as an inter mode, an IBC mode, or an IntraTMP mode (intra template matching prediction), and a CCRM flag is false (or the CCRM is not applied).

In an aspect, a syntax element or other coded information (e.g., flag information), such as a flag, may be signaled to indicate whether the P-CCRM is applied or not when a coded block is coded in certain prediction modes, such as an inter mode, an IBC mode, or an IntraTMP mode. If the flag is false (or the P-CCRM is not applied), a CCRM flag may be signaled to indicate whether the CCRM is applied or not when the CCRM is available to the coded block.

In an aspect, syntax elements or other coded information (e.g., flag information), such as two flags, may be signaled to indicate whether the P-CCRM is applied or not for a Cb component and a Cr component respectively.

In an aspect, any cross-component filter coefficient derivation may be applied to derive a filter coefficient for the P-CCRM. The cross-component filter coefficient derivation may include one of but is not limited to CCLM, MMLM, CCCM, and/or GLM.

In an aspect, two P-CCRM filter coefficient derivations may be applied to a Cb component and a Cr component, respectively. For example, a first P-CCRM filter coefficient derivation may be operated, such as at the step (S901), to derive a filter coefficient for the Cr component of chroma samples, and a second P-CCRM filter coefficient derivation may be operated, such as at the step (S901), to derive a filter coefficient for the Cb component of the chroma samples.

In an aspect, when filter coefficients cannot be derived for one of a Cb component and a Cr component, a filter output of the P-CCRM, may be set as zero for one of the Cb and Cr components for which the filter coefficients cannot be derived, such as when the P-CCRM flag is true.

In an example, when filter coefficients of a Cb component cannot be derived, a filter output may be set as zero for the Cb component. Thus, the chroma reconstructed sample (914) of the Cb component may be reconstructed by the chroma residual (908) of the Ch component or the initial chroma residual of the Cb component.

In an example, when filter coefficients of a Cr component cannot be derived, a filter output may be set as zero for the Cr component. Thus, the chroma reconstructed sample (914) of the Cr component may be reconstructed by the chroma residual (908) of the Cr component or the initial chroma residual of the Cr component.

In an aspect, a minimum value and/or a maximum value may be applied to clip a filter output, such as the filter output at the step (S901), within a desired dynamic range.

It an aspect, when a chroma coded block is coded by a cross-component model, a filter coefficient that is derived from the cross-component model to determine a chroma intra prediction (e.g., the chroma predictor (904)) may be applied on luma residual data to predict a chroma residual data. A final chroma predictor may be derived based on the predicted chroma residual data and the chroma intra predictor derived by the cross-component model.

In an example, as shown in FIG. 9, the cross-component filter coefficient derivation shown at step (S901) may be skipped. A filter coefficient obtained from a cross-component model may be applied on the luma residual (910) to obtain the derived chroma residual (906). The filter coefficient from the cross-component model may have been applied to determine the chroma predictor (904). The chroma reconstructed sample (914) may be determined as a sum of the chroma predictor (904), the derived chroma residual (906), and the chroma residual (908).

In an example, the cross-component model may include one of, but is not limited to, CCLM, MMLM, CCCM, and/or GLM.

Figure 10:
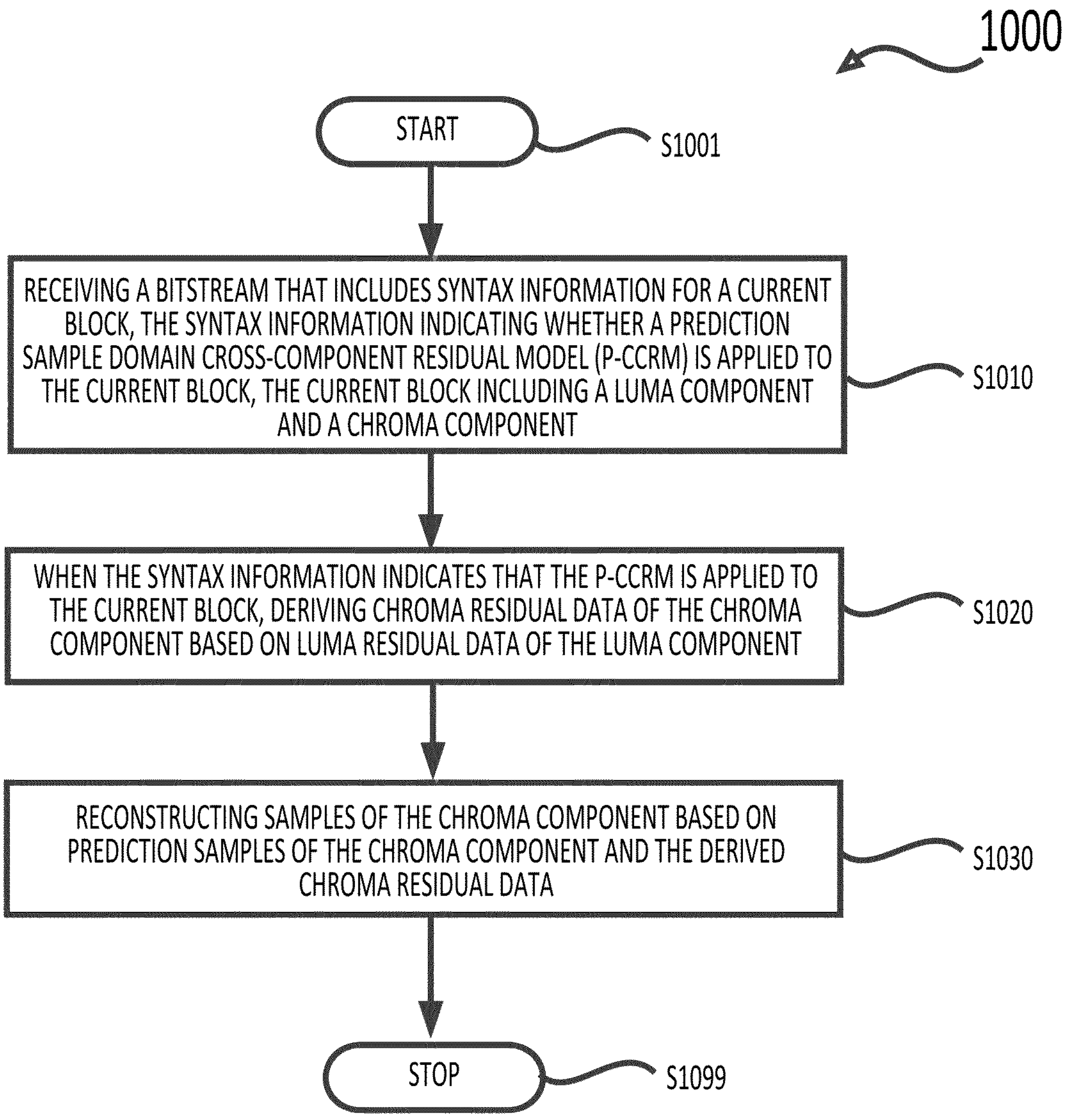
FIG. 10 shows a flow chart outlining a decoding process according to some aspects of the disclosure.

FIG. 10 shows a flow chart outlining a process (1000) according to an aspect of the disclosure. The process (1000) can be used in a video decoder. In various aspects, the process (1000) is executed by processing circuitry, such as the processing circuitry that performs functions of the video decoder (110), the processing circuitry that performs functions of the video decoder (210), and the like. In some aspects, the process (1000) is implemented in software instructions, thus when the processing circuitry executes the software instructions, the processing circuitry performs the process (1000). The process starts at (S1001) and proceeds to (S1010).

At (S1010), a bitstream that includes syntax information for a current block is received. The syntax information indicates whether a prediction sample domain cross-component residual model (P-CCRM) is applied to the current block. The current block includes a luma component and a chroma component.

At (S1020), when the syntax information indicates that the P-CCRM is applied to the current block, chroma residual data of the chroma component is derived based on luma residual data of the luma component.

At (S1030), samples of the chroma component are reconstructed based on prediction samples of the chroma component and the derived chroma residual data.

In an example, filter coefficients of a filter are derived based on prediction samples of the luma component and the prediction samples of the chroma component. The filter coefficients of the filter are applied to the luma residual data of the luma component. The chroma residual data is derived based on the luma residual data of the luma component to which the filter coefficients of the filter are applied.

In an example, the syntax information is included in the bitstream when the chroma component of the current block is coded based on one of a derived model (DM) and a cross-component model. The cross-component model includes one of a cross-component linear model (CCLM), a multi-model linear model (MMLM), a convolutional cross-component intra prediction model (CCCM), and a gradient linear model (GLM).

In an example, the syntax information is included in the bitstream when (i) the chroma component of the current block is coded based on one of an inter mode, an intra block copy (IBC) mode, and an intra template matching prediction (intraTMP) mode and (ii) a cross-component residual model (CCRM) is not applied to the current block.

In an example, when the syntax information indicates that the P-CCRM is not applied to the current block, the bitstream includes another syntax information that indicates whether the CCRM is applied to the current block.

In an example, the syntax information includes a first syntax element that indicates whether the P-CCRM is applied to a Cb component of the chroma component and a second syntax element that indicates whether the P-CCRM is applied to a Cr component of the chroma component.

In an example, the filter coefficients of the filter are derived based on one of a cross-component linear model (CCLM), a multi-model linear model (MMLM), a convolutional cross-component intra prediction model (CCCM), and a gradient linear model (GLM).

In an example, the filter coefficients of the filter are derived for a Cb component of the chroma component and the filter coefficients of the filter are derived for a Cr component of the chroma component.

In an example, when the filter coefficients of the filter are not derivable for a Cb component of the chroma component, the chroma residual data is set as zero for the Cb component.

In an example, when the filter coefficients of the filter are not derivable for a Cr component of the chroma component, the chroma residual data is set as zero for the Cr component.

In an example, when the chroma component of the current block is coded based on a cross-component model, filter coefficients of a filter are derived based on the cross-component model. The filter coefficients of the filter are applied on the luma residual data of the luma component. The chroma residual data is derived based on the luma residual data of the luma component to which the filter coefficients of the filter are applied.

Then, the process proceeds to (S1099) and terminates.

The process (1000) can be suitably adapted. Step(s) in the process (1000) can be modified and/or omitted. Additional step(s) can be added. Any suitable order of implementation can be used.

Figure 11:
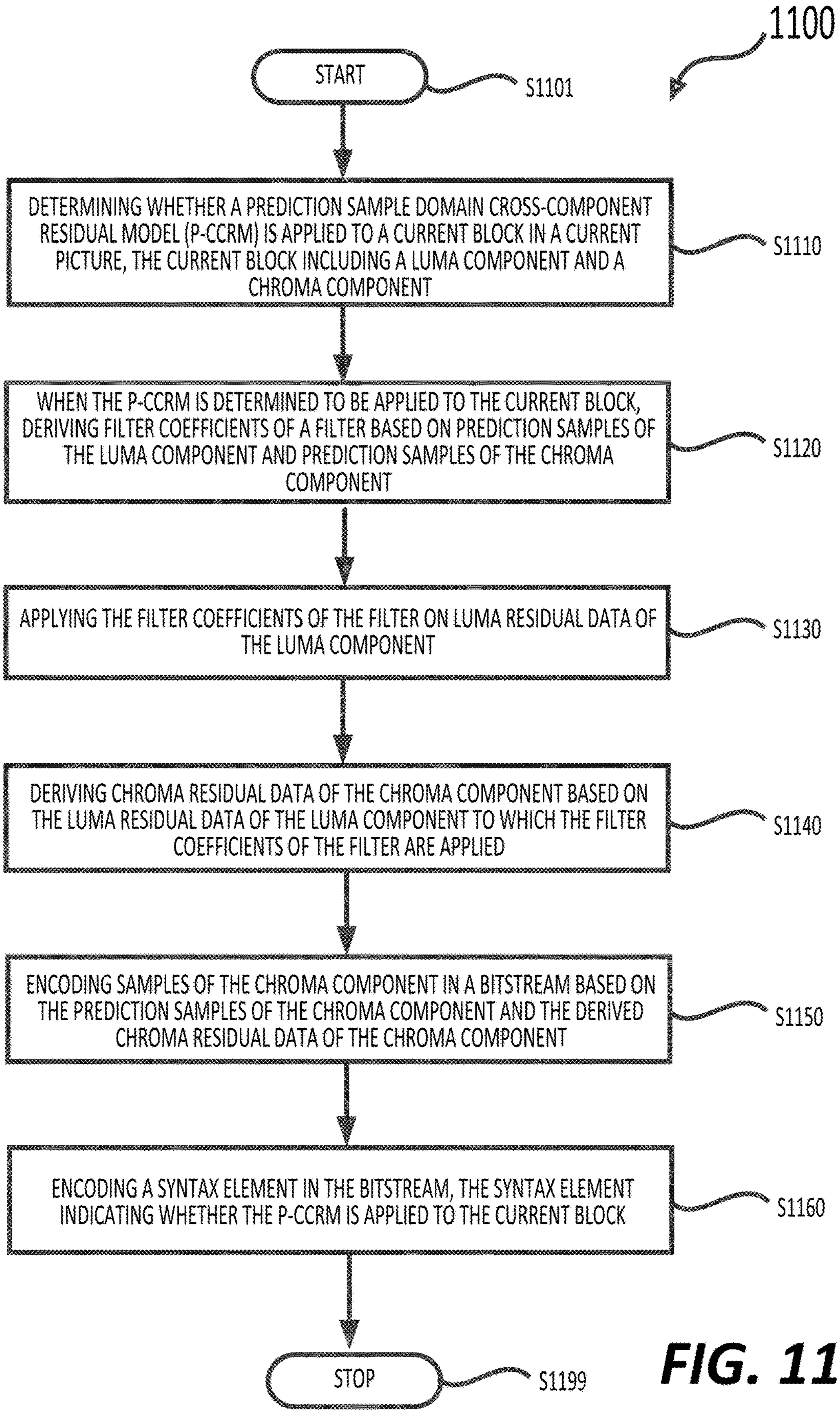
FIG. 11 shows a flow chart outlining an encoding process according to some aspects of the disclosure.

FIG. 11 shows a flow chart outlining a process (1100) according to an aspect of the disclosure. The process (1100) can be used in a video encoder. In various aspects, the process (1100) is executed by processing circuitry, such as the processing circuitry that performs functions of the video encoder (103), the processing circuitry that performs functions of the video encoder (303), and the like. In some aspects, the process (1100) is implemented in software instructions, thus when the processing circuitry executes the software instructions, the processing circuitry performs the process (1100). The process starts at (S1101) and proceeds to (S1110).

At (S1110), whether a P-CCRM is applied to a current block in a current picture is determined. The current block includes a luma component and a chroma component.

At (S1120), when the P-CCRM is determined to be applied to the current block, filter coefficients of a filter are derived based on prediction samples of the luma component and prediction samples of the chroma component.

At (S1130), the filter coefficients of the filter are applied on luma residual data of the luma component.

At (S1140), chroma residual data of the chroma component is derived based on the luma residual data of the luma component to which the filter coefficients of the filter are applied.

At (S1150), samples of the chroma component are encoded in a bitstream based on the prediction samples of the chroma component and the derived chroma residual data of the chroma component.

At (S1160), syntax element is encoded in the bitstream, where the syntax element indicates whether the P-CCRM is applied to the current block.

In an example, whether the P-CCRM is applied to the current block is determined when the chroma component of the current block is coded based on one of a derived model (DM) and a cross-component model. The cross-component model includes one of a cross-component linear model (CCLM), a multi-model linear model (MMLM), a convolutional cross-component intra prediction model (CCCM), and a gradient linear model (GLM).

In an example, whether the P-CCRM is applied to the current block is determined when (i) the chroma component of the current block is coded based on one of an inter mode, an intra block copy (IBC) mode, and an intra template matching prediction (intraTMP) mode and (ii) a cross-component residual model (CCRM) is not applied to the current block.

In an example, when the P-CCRM is determined not to be applied to the current block, another syntax element is encoded in the bitstream, where the other syntax element indicates whether the CCRM is applied to the current block.

Then, the process proceeds to (S1199) and terminates.

The process (1100) can be suitably adapted. Step(s) in the process (1100) can be modified and/or omitted. Additional step(s) can be added. Any suitable order of implementation can be used.

In the disclosure, a method of processing visual media data is provided. In the method, a bitstream of the visual media data is processed according to a format rule. In an example, the bitstream includes a syntax element of a current block in a current picture. The current block includes a luma component and a chroma component. The format rule specifies that the syntax element is included in the bitstream for the current block when a cross-component residual model (CCRM) is not applied to the current block. The syntax element indicates whether a prediction sample domain cross-component residual model (P-CCRM) is applied to the current block. When the syntax element indicates that the P-CCRM is applied to the current block, the format rule specifies that chroma residual data of the chroma component is derived based on the luma residual data of the luma component. The format rule specifies that samples of the chroma component are processed based on the prediction samples of the chroma component and the derived chroma residual data of the chroma component.

In an aspect, the format rule specifies that filter coefficients of a filter are derived based on prediction samples of the luma component and prediction samples of the chroma component. The format rule specifies that the filter coefficients of the filter is applied to a luma residual data of the luma component. The format rule specifies that chroma residual data of the chroma component is derived based on the luma residual data of the luma component to which the filter coefficients of the filter are applied.

The techniques described above, can be implemented as computer software using computer-readable instructions and physically stored in one or more computer-readable media. For example, FIG. 12 shows a computer system (1200) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
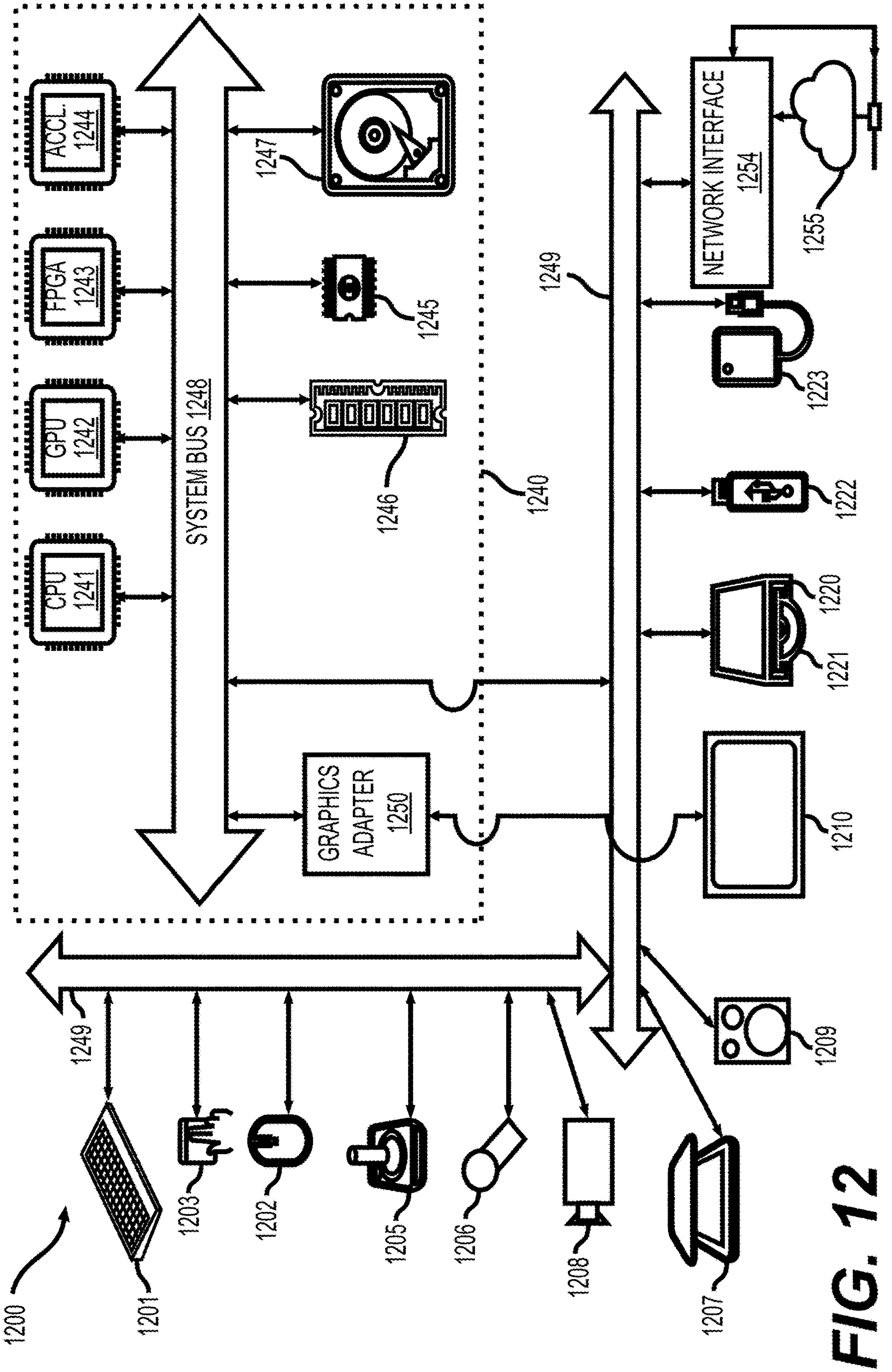
FIG. 12 is a schematic illustration of a computer system in accordance with an aspect.

The components shown in FIG. 12 for computer system (1200) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface (1254) to one or more communication networks (1255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), graphics adapters (1250), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). In an example, the screen (1210) can be connected to the graphics adapter (1250). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various aspects of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:

receiving a bitstream that includes syntax information for a current block, the syntax information indicating whether a prediction sample domain cross-component residual model (P-CCRM) is applied to the current block, the current block including a luma component and a chroma component;

when the syntax information indicates that the P-CCRM is applied to the current block, deriving chroma residual data of the chroma component based on luma residual data of the luma component; and reconstructing samples of the chroma component based on prediction samples of the chroma component and the derived chroma residual data.

2. The method of claim 1, wherein the deriving further comprises:

deriving filter coefficients of a filter based on prediction samples of the luma component and the prediction samples of the chroma component;

applying the filter coefficients of the filter to the luma residual data of the luma component; and deriving the chroma residual data based on the luma residual data of the luma component to which the filter coefficients of the filter are applied.

3. The method of claim 1, wherein the syntax information is included in the bitstream when the chroma component of the current block is coded based on one of a derived model (DM) and a cross-component model, the cross-component model including one of a cross-component linear model (CCLM), a multi-model linear model (MMLM), a convolutional cross-component intra prediction model (CCCM), and a gradient linear model (GLM).

4. The method of claim 1, wherein the syntax information is included in the bitstream when (i) the chroma component of the current block is coded based on one of an inter mode, an intra block copy (IBC) mode, and an intra template matching prediction (intraTMP) mode and (ii) a cross-component residual model (CCRM) is not applied to the current block.

5. The method of claim 4, wherein:

when the syntax information indicates that the P-CCRM is not applied to the current block, the bitstream includes another syntax information that indicates whether the CCRM is applied to the current block.

6. The method of claim 1, wherein the syntax information includes a first syntax element that indicates whether the P-CCRM is applied to a Cb component of the chroma component and a second syntax element that indicates whether the P-CCRM is applied to a Cr component of the chroma component.

7. The method of claim 2, wherein the deriving further comprises:

deriving the filter coefficients of the filter based on one of a cross-component linear model (CCLM), a multi-model linear model (MMLM), a convolutional cross-component intra prediction model (CCCM), and a gradient linear model (GLM).

8. The method of claim 2, wherein the deriving further comprises:

deriving the filter coefficients of the filter for a Cb component of the chroma component and the filter coefficients of the filter for a Cr component of the chroma component.

9. The method of claim 2, wherein the deriving further comprises:

when the filter coefficients of the filter are not derivable for a Cb component of the chroma component, setting the chroma residual data as zero for the Cb component.

10. The method of claim 2, wherein the deriving further comprises:

when the filter coefficients of the filter are not derivable for a Cr component of the chroma component, setting the chroma residual data as zero for the Cr component.

11. The method of claim 1, wherein the deriving further comprises:

when the chroma component of the current block is coded based on a cross-component model, deriving filter coefficients of a filter based on the cross-component model;

applying the filter coefficients of the filter on the luma residual data of the luma component; and deriving the chroma residual data based on the luma residual data of the luma component to which the filter coefficients of the filter are applied.

12. A method of video encoding, comprising:

determining whether a prediction sample domain cross-component residual model (P-CCRM) is applied to a current block in a current picture, the current block including a luma component and a chroma component; and when the P-CCRM is determined to be applied to the current block, deriving chroma residual data of the chroma component based on luma residual data of the luma component;

encoding samples of the chroma component into a bitstream based on prediction samples of the chroma component and the derived chroma residual data; and encoding a syntax element in the bitstream, the syntax element indicating whether the P-CCRM is applied to the current block.

13. The method of claim 12, wherein the deriving further comprises:

deriving filter coefficients of a filter based on prediction samples of the luma component and the prediction samples of the chroma component;

applying the filter coefficients of the filter to the luma residual data of the luma component; and deriving the chroma residual data based on the luma residual data of the luma component to which the filter coefficients of the filter are applied.

14. The method of claim 12, wherein the syntax element is encoded into the bitstream when the chroma component of the current block is coded based on one of a derived model (DM) and a cross-component model, the cross-component model including one of a cross-component linear model (CCLM), a multi-model linear model (MMLM), a convolutional cross-component intra prediction model (CCCM), and a gradient linear model (GLM).

15. The method of claim 12, wherein the syntax element is encoded into the bitstream when (i) the chroma component of the current block is coded based on one of an inter mode, an intra block copy (IBC) mode, and an intra template matching prediction (intraTMP) mode and (ii) a cross-component residual model (CCRM) is not applied to the current block.

16. The method of claim 15, wherein:

when the syntax element indicates that the P-CCRM is not applied to the current block, encoding another syntax element into the bitstream to indicate whether the CCRM is applied to the current block.

17. The method of claim 12, wherein the syntax element includes a first syntax element that indicates whether the P-CCRM is applied to a Cb component of the chroma component and a second syntax element that indicates whether the P-CCRM is applied to a Cr component of the chroma component.

18. The method of claim 13, wherein the deriving further comprises:

deriving the filter coefficients of the filter based on one of a cross-component linear model (CCLM), a multi-model linear model (MMLM), a convolutional cross-component intra prediction model (CCCM), and a gradient linear model (GLM).

19. The method of claim 13, wherein the deriving further comprises:

deriving the filter coefficients of the filter for a Cb component of the chroma component and the filter coefficients of the filter for a Cr component of the chroma component.

20. A non-transitory computer-readable storage medium storing instructions which when executed by a processor cause the processor to perform an encoding method comprising:

determining whether a prediction sample domain cross-component residual model (P-CCRM) is applied to a current block in a current picture, the current block including a luma component and a chroma component; and when the P-CCRM is determined to be applied to the current block, deriving chroma residual data of the chroma component based on luma residual data of the luma component;

encoding samples of the chroma component into a bitstream based on prediction samples of the chroma component and the derived chroma residual data;

encoding a syntax element in the bitstream, the syntax element indicating whether the P-CCRM is applied to the current block; and transmitting the encoded bitstream.

* * * * *